United States Patent
Hara et al.

(10) Patent No.: US 7,740,934 B2
(45) Date of Patent: Jun. 22, 2010

(54) OPTICAL LOW PASS FILTER

(75) Inventors: Kazuhiro Hara, Suwa (JP); Hiroyuki Mukaiyama, Minowa-machi (JP); Takehiko Uehara, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 308 days.

(21) Appl. No.: 11/468,518

(22) Filed: Aug. 30, 2006

(65) Prior Publication Data

US 2007/0081264 A1    Apr. 12, 2007

(30) Foreign Application Priority Data

Sep. 8, 2005   (JP) .......................... 2005-260493
Jul. 14, 2006  (JP) .......................... 2006-194787

(51) Int. Cl.
*B32B 17/06*   (2006.01)
*G02B 5/22*    (2006.01)

(52) U.S. Cl. .................. 428/336; 428/332; 428/334; 428/426; 359/885

(58) Field of Classification Search ............. None
See application file for complete search history.

(56) References Cited

U.S. PATENT DOCUMENTS

| 7,006,286 B2 | 2/2006 | Satake et al. |
| 7,567,382 B2 * | 7/2009 | Shogaki et al. ............. 359/497 |
| 2006/0215266 A1 * | 9/2006 | Uehara et al. ............. 359/497 |

FOREIGN PATENT DOCUMENTS

| CN | 1525195 A | 9/2004 |
| CN | 1542501 A | 11/2004 |
| JP | U 61-28181 | 2/1986 |
| JP | A 2003-29035 | 1/2003 |
| JP | 2004354973 A * | 12/2004 |
| JP | A-2004-354973 | 12/2004 |
| JP | 2007-072268 | 3/2007 |

* cited by examiner

*Primary Examiner*—Monique R Jackson
(74) *Attorney, Agent, or Firm*—Oliff & Berridge, PLC

(57) ABSTRACT

An optical low pass filter includes: a plurality of optical elements formed by bonding together and an adhesion layer of adhesive that is installed at each of interfaces of the plurality of optical elements to be bonded. The transmitted wave aberration is ±1.5λ or less (λ representing incident wavelength).

9 Claims, 7 Drawing Sheets

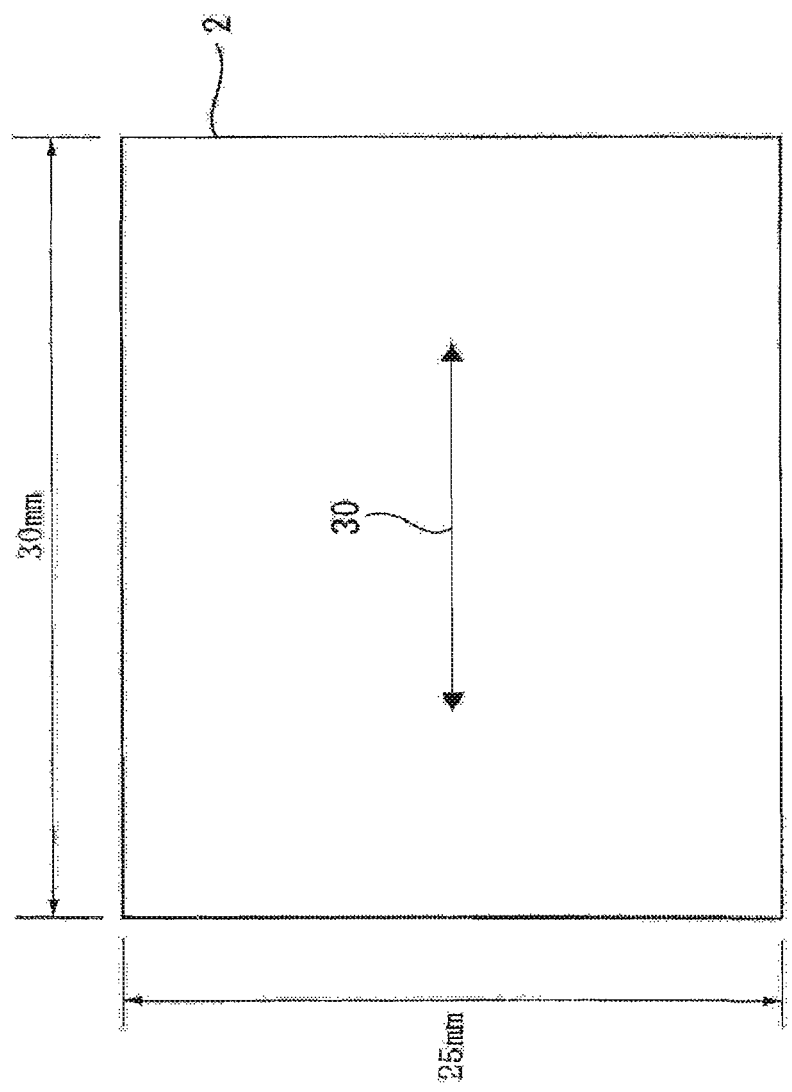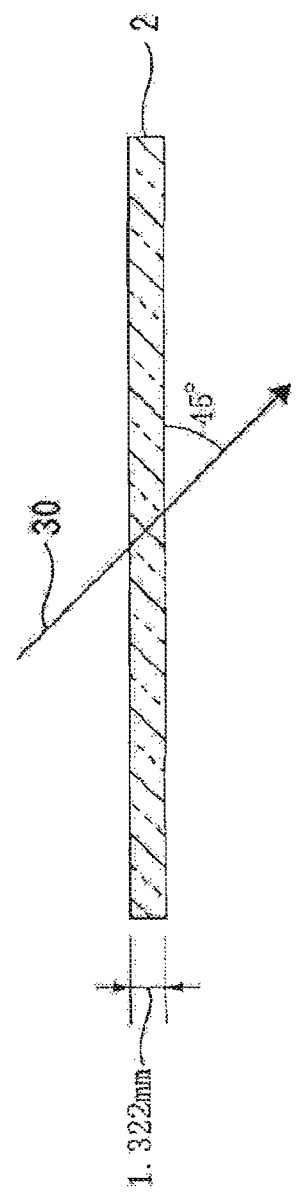
FIG. 2A
FIG. 2B

OPTICAL LOW PASS FILTER

BACKGROUND

1. Technical Field

The present invention relates to an optical low pass filter.

2. Related Art

Solid-state image sensors such as a CCD or a CMOS are widely used in video cameras and digital still cameras to capture optical images produced by a receive lens by converting the images into electronic signals. These solid-state image sensors have a structure in which photodiodes are arranged in a regular manner. Here, if the sampling frequency determined from the arranged spacing is surpassed by the spatial frequency of an optical image, moire or other false signals may occur. In order to prevent such false signals, an optical low pass filter using birefringent plates is placed between the receive lens and the solid-state image sensor. The optical low pass filters that are in use include a two-point separation type using a single birefringent plate and a high-performance four-point separation type in which either a retardation plate or a birefringent plate is sandwiched between two birefringent plates.

In order to form such an optical low pass filter, it is necessary to bond solidly together either birefringent plates with one another or a birefringent plate with a retardation plate, without producing bubbles. This bonding process has been performed manually in the past, causing a lot of burden for workers, and sometimes hampered stable supply of good-quality products because differences in the skill of workers created problems, including variability in the thickness of the bond layers, and prevented production of goods with a stable quality.

Under such circumstances, techniques have been proposed to keep a constant thickness for the bond layers by automating the bonding process and applying a proper amount of bond to optical elements (e.g. JP-A-2003-29035). Also proposed are techniques to enhance the bond strength by using bond and high melting wax (e.g. JP-Y-61-28181).

However, the techniques disclosed in JP-A-2003-29035 and JP-Y-61-28181 both use a curable bond and, thus, have been unable to solve such problems as bubbles being mixed into the bond or the appearance being deteriorated through spillage of the bond from bonded ends.

SUMMARY

An advantage of the invention is to provide an optical low pass filter that solves the above problems created by using curable bonds and performs a good optical characteristic when incorporated into optical apparatuses including video cameras and digital still cameras.

An optical low pass filter according to an aspect of the invention is formed by bonding together a plurality of optical elements with one another, the bonded interfaces of the plurality of optical elements being each provided with an adhesion layer of adhesive and the filter having a transmitted wave aberration of not more than $\pm 1.5\lambda$ ($\lambda$ representing the incident wavelength).

Different from the case of techniques where curable bonds are used, bubbles are not generated in the adhesion layers here because a pressure sensitive adhesive is used as a means for bonding the plurality of optical elements with one another. Moreover, use of a pressure sensitive adhesive prevents the optical elements from going out of a proper alignment with one another and provides them with a consistent adhesion for each bonded interface, thus realizing consistent bond strength for the elements after bonded together.

In addition, the optical characteristic is excellent in the optical apparatuses incorporated with the optical low pass filter because the transmitted wave aberration of the optical low pass filter is $\pm 1.5\lambda$ or less. Preferably, the transmitted wave aberration is $\pm 1.2\lambda$ or less, and more preferably $\pm 1.0\lambda$ or less.

It is preferable that the plurality of optical elements include quartz crystal plates, the quartz crystal plates being provided with an adhesion layer at each of their bonded interfaces, the adhesion layer having an average thickness of 5 to 15 μm within each individual layer and a difference between the thickest and the thinnest portions of 4 μm or less within each individual layer.

As the average thickness of the adhesion layer provided at each bonded interface of the quartz crystal plates is 5 to 15 μm while the difference between the thickest and the thinnest portions thereof is 4 μm or less, within each individual layer, a sufficient adhesion strength (bond strength) can be maintained while less stress is given to the quartz crystal plates. Thus, the transmitted wave aberration can be constantly kept at $\pm 1.5\lambda$ or less.

It is preferable that the plurality of optical elements include quartz crystal plates and a flexible retardation film, the quartz crystal plates and the retardation film being provided with an adhesion layer at each of their bonded interfaces, the average thickness of the adhesion layer being 5 to 15 μm and the difference between the thickest and the thinnest portions thereof being 4 μm or less, within each individual layer.

The flexibility of the retardation film greatly facilitates the bonding process between the film and the quartz crystal plates. Also, bubbles can be prevented more reliably from being mixed into the adhesion layer through a process in which a retardation film is first bent to have one of its ends bonded onto a quartz crystal plate and then brought back to its original planar state until it is bonded completely together with the quartz crystal plate. In addition, using the retardation film can reduce the weight of the optical low pass filter.

Since the average thickness of the adhesion layer is 5 to 15 μm while the difference between the thickest and the thinnest portions is 4 μm or less, within each individual layer, a sufficient adhesion strength can be maintained while less stress is given to the retardation film and the quartz crystal plates, thus allowing the transmitted wave aberration to be constantly kept at $\pm 1.5\lambda$ or less.

The adhesive power of the adhesion layer is preferably at least 10 N/25 mm (based on JIS Z 0237, peel test by 180-degree angle).

Since the adhesive power of the adhesion layer is at least 10 N/25 mm, the optical low pass filter can perform sufficient resistance against shocks when it is incorporated into products or when it is transported. Preferably, this adhesive power is not less than 15 N/25 mm, and more preferably at least 20 N/25 mm.

The ball tack value of the adhesion layers is preferably not less than 2 (based on JIS Z 0237, J. DOW Method).

The ball tack value for the adhesion layer of not less than 2 facilitates bonding of the optical elements with little misalignments. Preferably, this ball tack value is at least 4.

The optical low pass filter is formed through bonding a plurality of optical elements with one another, the bonded interfaces of the plurality of optical elements being each provided with an adhesion layer of adhesive, the adhesive being added with a silane coupling agent.

The addition of a silane coupling agent to the adhesive enhances its adhesive power at interfaces between the optical elements, thereby allowing the adhesion layers to be made thinner. As a result, it becomes easier to maintain the transmitted wave aberration of the optical low pass filter stably at 1.5 μm or less.

Furthermore, addition of a silane coupling agent to the adhesive enhances the adhesion thereof with the plurality of optical elements, thereby rendering the optical low pass filter more resistant to moisture and solvents.

BRIEF DESCRIPTION OF THE DRAWINGS

The invention will be described with reference to the accompanying drawings, wherein like numbers reference like elements.

FIGS. 2A and 2B are a front view and a sectional view of a first quartz crystal plate according to the embodiment.

DESCRIPTION OF EXEMPLARY EMBODIMENTS

An embodiment of the invention will now be described with reference to the accompanying drawings.

[Structure of Optical Low Pass Filter]

Figure 1:
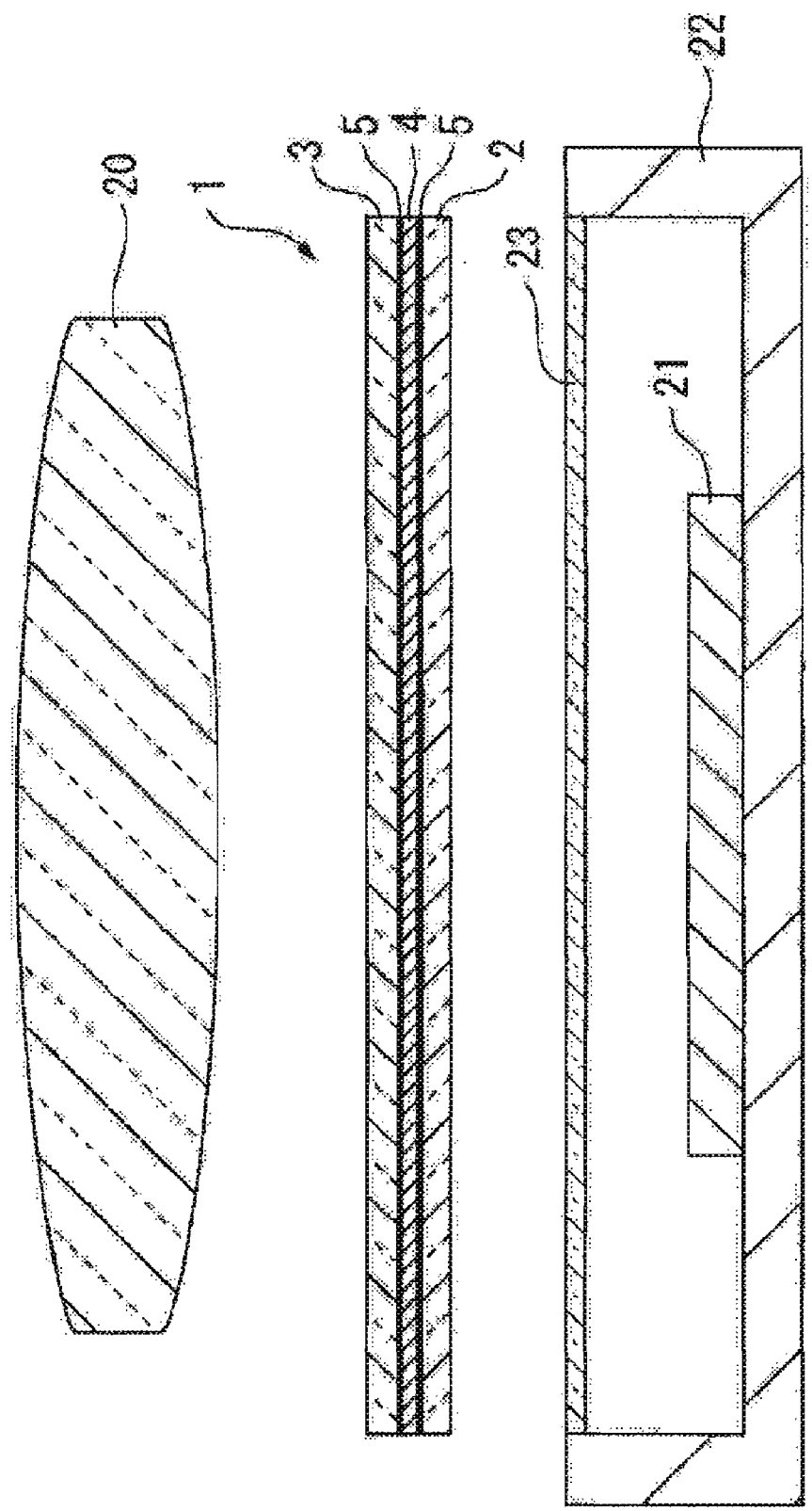
FIG. 1 is a sectional view schematically showing the arrangement of an optical low pass filter according to an embodiment of the invention.

FIG. 1 is a sectional view schematically showing relevant portions of a digital still camera in which a four-point separation-type optical low pass filter 1 according to the present embodiment is employed.

In FIG. 1, the optical low pass filter 1 is placed between a receive lens 20 that produces optical images from incident light and a solid-state image sensor 21 that captures the optical images by converting them into electronic signals.

The receive lens 20 may be a single lens or a group of a plurality of lenses. For the solid-state image sensor 21, a Charge Coupled Device (CCD) or a Complementary MOS (CMOS), for example, may be used.

The solid-state image sensor 21 is placed at the bottom of a concave package 22 having an opening on the side that faces toward the receive lens 20. The opening is blocked up with a cover glass 23 for prevention of dust. Here, a special high-purity glass that does not emit radioactive rays is used in order to prevent exposure of the solid-state image sensor 21 to radioactive rays including the alpha ray.

The optical low pass filter 1 includes a first quartz crystal plate 2 facing toward the solid-state image sensor 21, a second quartz crystal plate 3 facing toward the receive lens 20 and a flexible retardation film 4 that is sandwiched between the two plates. The bonded interfaces between the quartz crystal plates 2, 3 and the retardation film 4 are each provided with an adhesion layer 5.

FIG. 2A shows a plan view of the first quartz crystal plate 2 observed from the side of the receive lens 20, and FIG. 2B shows a sectional view of the same plate.

The first quartz crystal plate 2 is of the same size as the second quartz crystal plate 3. The optic axis of the second quartz crystal plate 3 is parallel to the longer side of its rectangular shape (See FIG. 2A), being present on the plain surface that is perpendicular to the incident surface and having a 45-degree angle with respect to the normal line of the incident surface (See FIG. 2B).

Here, the surface of the second quartz crystal plate 3 facing toward the receive lens 20 and the surface of the first quartz crystal plate 2 facing toward the solid-state image sensor 21 are each provided with an antireflection film (not illustrated) that improves the transmission of visible light.

Instead of the antireflection film, an infrared reflective film may be provided to prevent the infrared light from entering the solid-state image sensor 21.

Figure 3B:
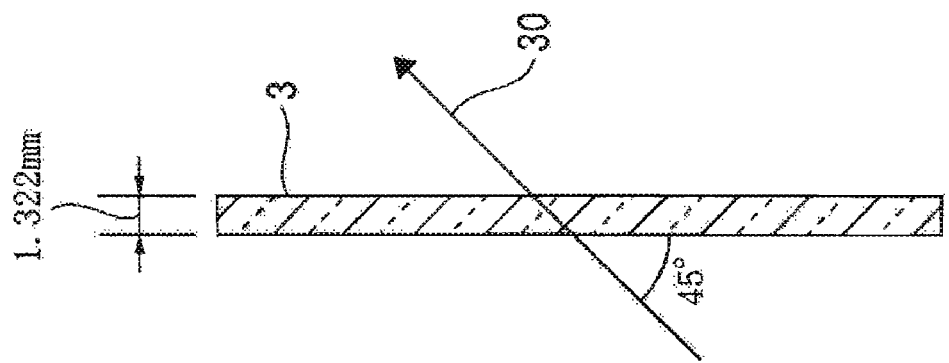
FIGS. 3A and 3B are a front view and a sectional view of a second quartz crystal plate according to the embodiment.
Figure 3A:
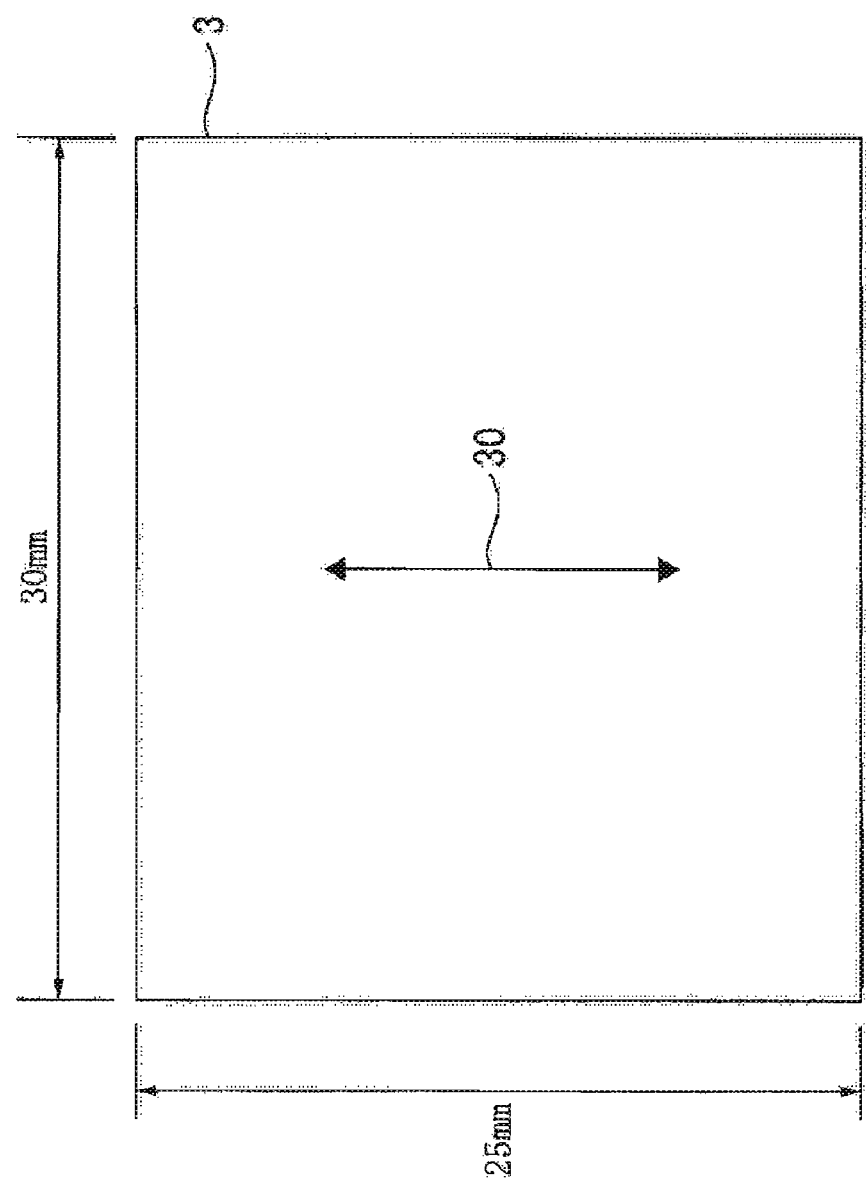

FIG. 3A shows a plan view of the second quartz crystal plate 3 observed from the side of the receive lens 20, and FIG. 3B shows its sectional view.

The second quartz crystal plate 3 is a rectangular (25×30 mm) quartz crystal plate with a thickness of 1.322 mm. Its optic axis 30 (the axis in a birefringent crystal in the direction in which birefringence does not occur) is parallel to its shorter side (See FIG. 3A), being present on a plain surface that is perpendicular to the incident surface, and has a 45-degree angle (See FIG. 3B) with respect to the normal line of the incident surface.

The first quartz crystal plate 2 and the second quartz crystal plate 3 are optically the same plates turned around an axis that is perpendicular to the quartz crystal plates so as to form a 90-degree angle with each other. In the bonding processes to be described later, quartz crystal plates of the same structure will be used to be bonded together in a state in which the two plates have been turned to form a 90-degree angle with each other.

A high-purity quartz crystal provided with a birefringent property is used for the first and the second quartz crystal plates 2, 3. Other crystals having such a property include lithium niobate, sodium nitrate, calcite, rutile, KDP ($KH_2PO_4$), ADP ($NH_4H_2PO_4$), and the like, but quartz crystal is the most preferable in terms of its strength and cost.

Figure 4:
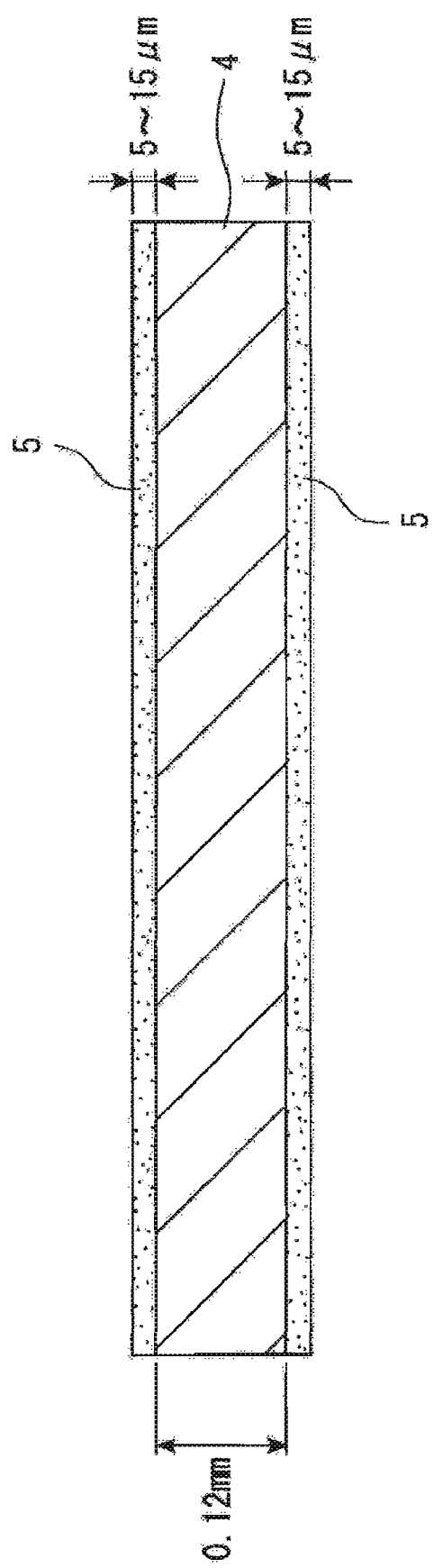
FIG. 4 is a sectional view of a retardation film according to the embodiment.

As shown in FIG. 4, a λ/4 plate of a plastic film made of 0.12 mm thick polycarbonate that has been applied a uniaxial drawing, is used for the retardation film 4. Here, the retardation film 4 is used by being bonded together with the first and the second quartz crystal plates through adhesion layers 5 (with the average thickness of 5 to 15 μm and the difference between the thickest and the thinnest portions of 4 μm or less, within each individual layer) that are provided respectively on both sides of the film.

Furthermore, though not illustrated, protection films are placed on both sides of the adhesion layers 5, which will be taken away immediately prior to bonding of the retardation film 4 with the quartz crystal plates 2, 3.

The thermoplastic resins used to form the plastic film that functions as the λ/4 plate include resin materials that each realize, when drawn, a retardation of 0.1 to 0.3 μm required for the retardation film 4. For example, cellulosic resins, polystyrene resins, vinyl chloride resins, polycarbonate resins, acrylonitrile resins, polyolefin resins, polyethersulfone resins, polyarylate resins, polymethyl methacrylate resins can be used.

Most of all, polycarbonate resins have high heat resistance, low water absorption and excellent durability and transparency. Moreover, by being mixed with a compound having an optical anisotropy, they can be provided with a wavelength dispersion characteristic that increases the retardation as the incident wavelength grows, thus making a high-performance λ/4 plate.

It is preferable that the wavelength dispersion characteristic of the retardation of a plastic film allow the retardation to grow as the incident wavelength increases. Specifically, it is preferable that the retardation is λ/4±0.05 μm within the range of visible light (0.4 to 0.8 μm), wherein the incident wavelength is represented by λ (μm).

This type of optical low pass filter 1 requires a transmitted wave aberration of ±1.5λ or less. When the transmitted wave aberration of the optical low pass filter 1 surpasses ±1.5λ, the optical characteristic is adversely affected in the optical apparatuses (digital still cameras and the like) incorporated with the relevant optical low pass filter 1. For example, quality of the images sensed will significantly deteriorate (e.g., straight lines and lattice patterns being subtly deformed or lines becoming thicker or thinner). Therefore, it is preferable that the transmitted wave aberration is ±1.2λ or less, and more preferably ±1.0λ or less.

In addition, transmitted wave aberration can be determined by using Verifire Series, for example, the high-precision interferometer-type shape determining machines made by ZYGO, to measure the homogeneity of parallel planes and determine the optical thickness.

[Adhesive and Adhesion Layers]

Now, a preferred embodiment of the adhesive used in the invention and the adhesion layers 5 formed by the adhesive will be described.

(Types of Adhesive)

Adhesives made of natural rubber, synthetic rubber, vinyl acetate/vinyl chloride copolymer, polyvinyl ether, acryl, modified polyolefin, and so on, may be used. Above all, acrylic adhesives consisting mainly of alkoxy alkyl ester acrylate is suitable for use due to their transparency, adhesion and durability.

(Adhesive Power)

Preferably, the adhesive power of the adhesive is at least 10 N/25 mm, more particularly at least 20 N/25 mm, in its peel strength measured by means of a peel test by 180-degree angle (based on JIS Z 0237) considering the load suffered by optical elements including the optical low pass filter at the time of assembly or shocks in transport.

Furthermore, a ball tack value of at least 2 is required, being measured by the ball tack test (based on JIS Z 0237, J. Dow Method), for the initial adhesive power. In order to prevent misalignment between optical elements when they are bonded together, an initial adhesive power of at least 4 is preferable.

(Transparency)

A high degree of transparency is required for the adhesive because it constitutes the light-transmitting surface of an optical element. A preferable haze of the low pass filter 1 is 1.0 or less, more preferably 0.5 or less, and most preferably 0.1 or less.

The more transparent the adhesive, the better because the haze may increase on account of other factors (e.g., optical thin films applied to quartz crystals also include some haze-increasing factor).

The haze mentioned here represents the overall haze determined by a method based on JIS K 7105.

(Smoothness)

Smoothness of the adhesion layers 5 (roughness aid waviness of the adhesion layer surfaces at the time when the adhesive is applied to the retardation film 4) signficantly affects the transmitted wave aberration of optical elements. When they are not adequately smooth, the transmitted wave aberration of optical elements increases, thereby deteriorating the optical performance of, for example, a digital still camera employing the optical low pass filter 1. Therefore, it is preferable that the adhesion layers 5 are as smooth as possible.

For example, it is preferable that the adhesive (solution) is applied in the following manner when it is applied to the retardation film 4 by a roll coater.

(1) The surface tension of the adhesive solution is reduced through addition of a leveling agent.
(2) The adhesive is dried slowly,
   (a) reducing the speed of coating;
   (b) making a dryness gradient; and
   (c) adding a high boiler.
(3) The viscosity of the coating slip is increased to such a degree that coating stripes are no more produced.
(4) Compatibility between the solid content (resin) and solvent of the adhesive is improved.

(Thickness of the Adhesion Layers)

When the adhesion layers 5 become too thick, the above-mentioned smoothness degrades. Also, since more adhesive is used, some of the adhesive may come out of the bonded surfaces to sides of the optical element, thereby making the sides sticky. In addition, the adhesive excessively plays the role of a buffer layer, so that any external force that is applied on parts of the layer may deform the filter. On the other hand, when the adhesion layers 5 are too thin and insufficient in their adhesive power, the optical elements may come apart from one another by physical or thermal shocks.

However, where, as in the case of the embodiment, the quartz crystal plates 2, 3 and the retardation film 4 are used, a certain amount of thickness is required in order to alleviate expansion (contraction) through heat.

Therefore, preferably, the average thickness of the adhesion layers 5 is 5 to 15 μm while the difference between the thickest and the thinnest portions is not more than 4 μm, within each individual layer. More preferably, the average thickness is 5 to 12 μm while the difference between the thickest and the thinnest portions is not more than 4 μm, and most preferably, the average thickness is 5 to 10 μm while the difference between the thickest and the thinnest portions is not more than 4 μm.

(Additive)

Generally, the thinner the adhesion layers are made, the lower the adhesive power. On the contrary, addition of a silane coupling agent to the adhesive enhances the adhesive power at the interfaces between the quartz crystal plates 2, 3 and the retardation film 4, thereby allowing the adhesion layers to be made thinner.

As a result, the transmitted wave aberration of the optical low pass filter 1 can be stably kept at 1.5 μm more easily.

Addition of a silane coupling agent to the adhesive also improves the adhesion between the respective quartz crystal plates 2, 3 and the retardation film 4, thereby enhancing, as a result, the resistance of the optical-low pass filter 1 against moisture and solvents.

Among the silane coupling agents to be used are, for example, γ-glycidoxypropyltrimethoxysilane, β-(3,4-epoxycyclohexyl)ethyltrimethoxysilane, γ-metacryloxypropyltrimethoxysilane, γ-metacryloxypropyltriethoxysilane, γ-acryloxypropylmethyldimethoxysilane, vinyl triethoxysilane, vinyl triacetoxysilane, p-trimethoxysilylstyrene, p-triethoxysilylstyrene, p-trimethoxysilyl-α-methylstyrene, p-triethoxysilyl-α-methylstyrene3-aminopropyltrimethoxysilane, 3-aminopropyltriethoxysilane, N-2(aminoethyl)3-aminopropylmethyldimethoxysilane, N-2(aminoethyl)3-aminopropyltrimethoxysilane, N-2(aminoethyl)3-aminopropyltriethoxysilane, N-phenyl-3-aminopropyltrimethoxysilane, N-phenyl-3-aminopropyltriethoxysilane, N-propyl-3-aminopropyltrimethoxysilane, 4-aminobutyltrimethoxysilane, deciletrimethoxysilane. These silane coupling agents may be used either separately or in a combination of two or more agents.

[Method for Manufacturing Optical Low Pass Filter]

A method for manufacturing the optical low pass filter 1 will now be described.

(Outline of Manufacturing Method)

Figure 5:
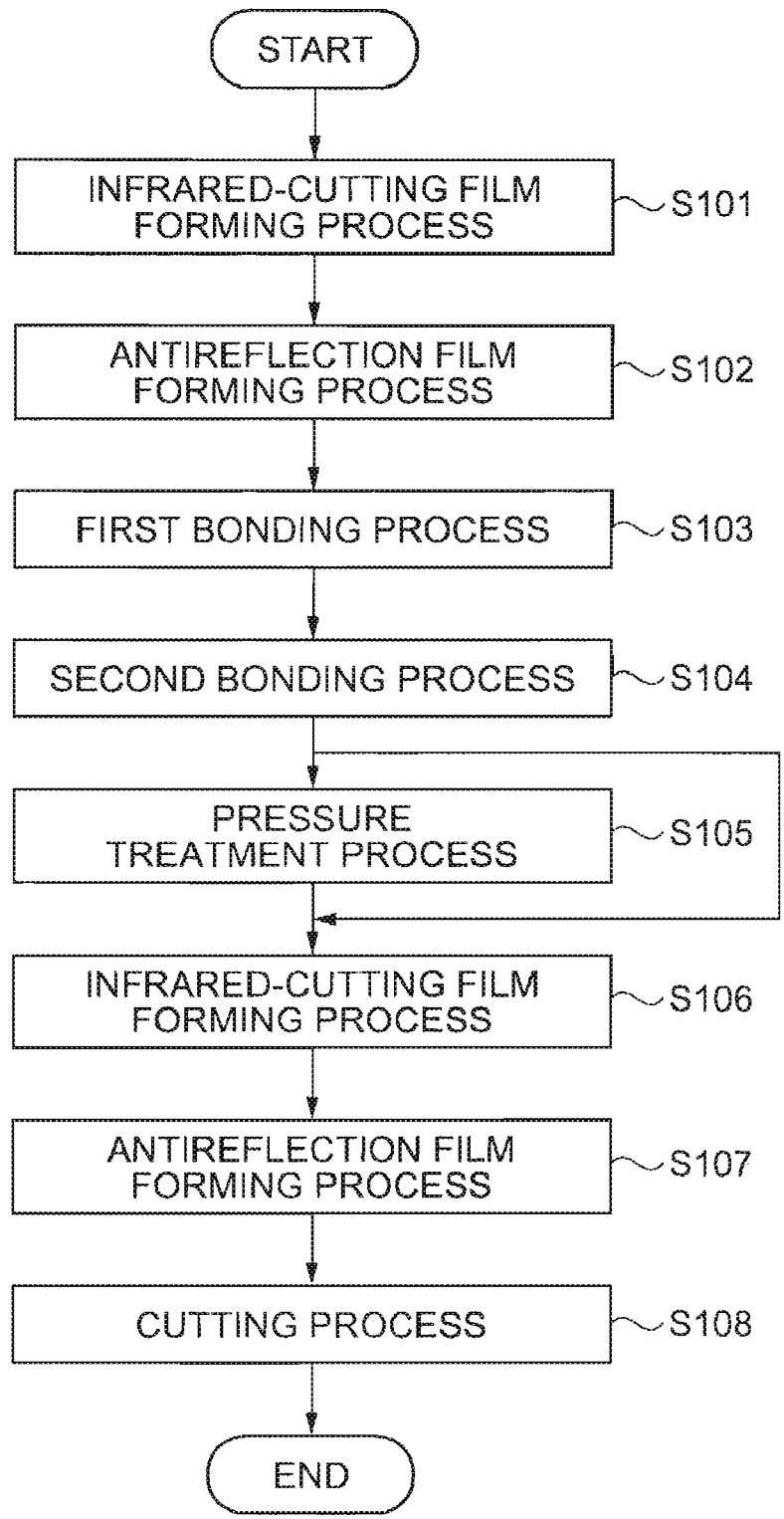
FIG. 5 is a flow chart showing an example of the process for manufacturing an optical low pass filter according to the embodiment.

FIG. 5 is a flow chart showing an example of the process for manufacturing the optical low pass filter 1 according to the embodiment.

The manufacturing process for the optical low pass filter 1 includes, in some cases, bonding together the first quartz crystal plate 2 and the second quartz crystal plate 3 on which an infrared cut-off film and an antireflection film have already been formed, respectively, but, in other cases, it includes first bonding the two quartz crystal plates together and then forming an infrared cut-off film and an antireflection film on the respective plates. When the first quartz crystal plate 2 and the second quartz crystal plate 3 are bonded together after the infrared cut-off film and the antireflection film have been formed, the two plates are first coated, each on the surface that will constitute the outer side, with an infrared cut-off film and an antireflection film, respectively (S101, S102). It is preferable that the infrared cut-off film and the antireflection film are formed-after the two plates have been bonded together, because formation of an infrared cut-off film may produce a bow in a birefringent plate.

The embodiment includes a first bonding process (S103) wherein the retardation film 4 is bonded to the first quartz crystal plate 2 and a second bonding process thereafter, wherein the retardation film 4 that has been bonded together with the first quartz crystal plate 2 is bonded to the second quartz crystal plate 3, thereby producing a three-layered primitive plate for the optical low pass filter 1 (S104). Then, according to need, a pressure treatment is performed on the primitive plate of the optical low pass filter 1, in warming the plate, to further consolidate the bond (S105). Next, according to need, an infrared cut-off film forming process is performed for forming an infrared cut-off film on one side of the primitive plate of the optical low pass filter 1 while another film forming process is performed for forming an antireflection film on the other side thereof (S106, S107), thereby adding to the primitive plate a function to cut infrared radiation and a function to reduce reflection to improve light transmittance. Lastly, after a cutting process to cut the primitive plate into a required size (S108), the product is inspected and packed to be finally shipped as the optical low pass filter 1.

Here, regarding the first bonding process in which the retardation film 4 is bonded to the first quartz crystal plate 2, the first quartz crystal plate 2 is hard whereas the retardation film 4 is flexible. Thus, the process may be performed in the air by pressing and bonding the retardation film 4 against the first quartz crystal plate 2 using a roller, thereby extruding bubbles. The first bonding process may also be performed in a vacuum atmosphere, though the manufacturing efficiency will deteriorate.

In the second bonding process in which the retardation film 4 is bonded to the second quartz crystal plate 3, the two plates to be bonded with each other are both hard. Therefore, it is preferable that the second bonding process is performed in a vacuum atmosphere.

(Structure of Bonding Apparatus)

Figure 6A:
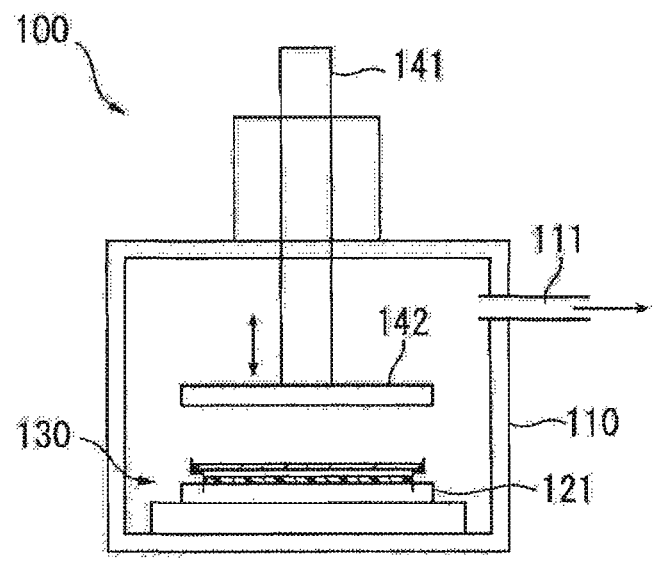
FIGS. 6A, 6B, 6C and 6D are diagrams showing a first bonding process according to the embodiment.

FIG. 6A is a side perspective view schematically showing the structure of a vacuum bonding apparatus 100 that can be used for both the first bonding process and the second bonding process.

Figure 6B:
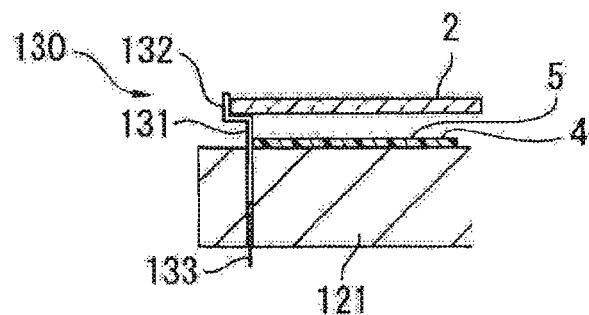
Figure 6C:
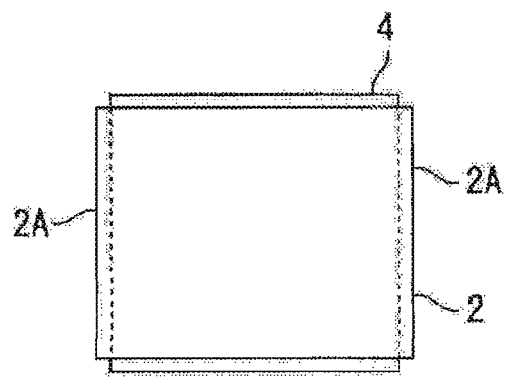
Figure 6D:
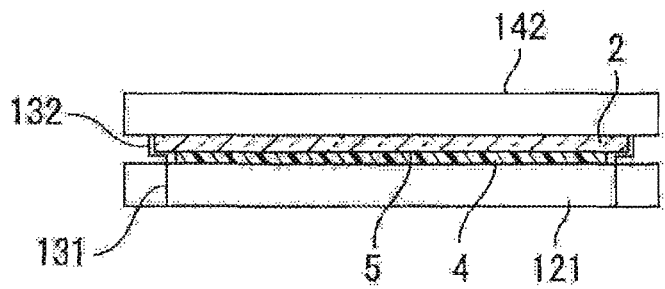

FIG. 6B is an enlarged view of a guide apparatus 130; FIG. 6C is a plan view showing the positional relation between the first quartz crystal plate 2 and the retardation film 4 when they are superposed to be bonded together, and FIG. 6D is a side view showing the state of things under a pressure bonding operation performed by the vacuum bonding apparatus 100.

The vacuum bonding apparatus 100 is equipped with a vacuum chamber 110, as shown in FIG. 6A, and connected to a vacuum apparatus, not illustrated, through a vacuum pipe 111, thus enabling vacuuming. On the base inside the vacuum chamber 110, a lower pressure bonding plate 121 is placed, the plate being a flat surface plate with a smoothly finished top surface. The lower pressure bonding plate 121 is larger than the first quartz crystal plate 2 and of a size that is sufficient to hold the first quartz crystal plate 2 and still have some room around the plate when mounted therewith. Near both ends of the lower pressure bonding plate 121, the guide apparatus 130 is placed in a liftable manner that allow it to move up and down in passing completely through the lower pressure bonding plate 121.

As shown in the enlarged view in FIG. 6B, the guide apparatus 130 includes liftable pins 131 that are held perpendicularly to the lower pressure bonding plate 121 and allowed to move up and down and guide holders 132 that are provided on the upper end of the pins in the form of L-shaped wires bent outwards. The guide holders 132 are capable of holding both edges of the shorter sides 2A of the rectangular-shaped first quartz crystal plate 2 while regulating, from both sides, the position of both side faces constituting the shorter sides 2A. The liftable pins 131 are urged upwards by elastic members 133, thereby spacing the guide holders 132 upwards at normal times from the top surface of the lower pressure bonding plate 121. The first quartz crystal plate 2 can be held in the air through being held by the guide holders 132. The liftable pins 131 are made in such a way that, when pressed vertically downwards, they move against the urge of the elastic members 133 down to the position where the first quartz crystal plate 2 held by the guide holders 132 touches the top surface of the lower pressure bonding plate 121. Besides the coil springs illustrated, a spring such as a flat spring or a fluid spring or an elastic body such as rubber, for example, may be used for the elastic members 133.

As illustrated in FIG. 6C, the retardation film 4 is formed to have a width that is slightly narrower than the length of the first quartz crystal plate 2 and slightly narrower than the spacing between both liftable pins 131. Thus, as shown in FIG. 6B, the retardation film 4 can be mounted on the lower pressure bonding plate 121 ill such a way that they are placed between the liftable pins 131.

A liftable shaft 141 is arranged in such a manner that it moves vertically in passing through the upper wall of the vacuum chamber 110, driven by a drive unit that is not illustrated. The upper pressure bonding plate 142 is fixed to the lower end of the liftable shaft 141. The bottom surface of the upper pressure bonding plate 142, which is parallel to the top surface of the lower pressure bonding plate 121, is finished smoothly. The upper pressure bonding plate 142 has approximately the same shape as the lower pressure bonding plate 121, and has the shape and size that allow the upper plate to cover the whole of the first quartz crystal plate 2. The liftable shaft 141 is driven in such a manner that it is capable of moving the upper pressure bonding plate 142 down to the position where the plate touches the top surface of the lower pressure bonding plate 121 and apply pressure there.

Now, the first bonding process and the second bonding process will be described, the processes being important in the manufacturing process for the optical low pass filter 1.

(The First Bonding Process)

A method of performing the first bonding process under a vacuum atmosphere using the vacuum bonding apparatus 100 will be described, in referencing FIGS. 6A, 6B, 6C and 6D. The retardation film 4 used in this case will be of the type that has an adhesion layer 5 (provided with a protection film) on both sides.

The first quartz crystal plate 2 and the second quartz crystal plate 3 to be used are cleaned in advance by a cleaning process to remove extraneous matters from the surface. First, the door, not illustrated, of the vacuum chamber 110 is opened to mount the retardation film 4, with one of the protection films peeled off, onto a predetermined position of the lower pressure bonding plate 121, in such a manner that the exposed adhesion layer 5 is on the upper surface of the film. Then, the first quartz crystal plate 2 is mounted on the guide holders 132 of the guide apparatus 130. Thus, the first quartz crystal plate 2 and the retardation film 4 are placed in such a way that they overlap each other in a manner shown in FIG. 6C. That is when observed from above, both edges on the shorter sides 2A of the first quartz crystal plate 2 run off the edges of the retardation film 4. Both edges on the shorter sides 2A of the first quartz crystal plate 2 are held by the guide holders 132 of the guide apparatus 130, thereby rendering the first quartz crystal plate 2 to be held in the air over the retardation film 4 in such a manner that they are spaced in facing each other.

Next, the door, not illustrated, of the vacuum chamber 110 is closed to actuate the vacuum apparatus, not illustrated, and the interior of the vacuum chamber 110 is vacuumed via the vacuum pipe 111. After the interior of the vacuum chamber 110 has attained a predetermined degree of vacuum, the liftable shaft 141 is lowered by the drive unit that is not illustrated. As the liftable shaft 141 moves down, the upper pressure bonding plate 142 also moves down and touches the upper end of the guide holders 132. The upper pressure bonding plate 142 is further lowered in pushing down on the guide holders 132 against the urging power of the elastic members 133 urging the liftable pins 131 upwards, until the first quartz crystal plate 2 held by the guide holders 132 comes into contact with the retardation film 4 mounted on the lower pressure bonding plate 121. Then, the upper pressure bonding plate 142 is made to press the first quartz crystal plate 2 at a predetermined pressure, thereby pressure bonding the first quartz crystal plate 2 and the retardation film 4, being sandwiched between the upper pressure bonding plate 142 and the lower pressure bonding plate 121, together at a predetermined pressure, as shown in FIG. 6D. The overlap between the first quartz crystal plate 2 and the retardation film 4, at the time of this pressure bonding, is kept in accordance with the arrangement shown in FIG. 6C. After they have been pressure bonded together for a predetermined amount of time, the drive unit, not illustrated, is driven to lift the liftable shaft 141 and, thus, to lift the upper pressure bonding plate 142. With the ascent of the upper pressure bonding plate 142, the guide holders 132 are raised by the urging power of the elastic members 133 in holding the first quartz crystal plate 2 that have been bonded together with the retardation film, to return to the original position.

Then, air is introduced to the interior of the vacuum chamber 110 after the vacuum pipe 111 of the vacuum chamber 110 has been blocked, in order to recover the atmospheric pressure in the interior. Thus, the first bonding process is over.

(Second Bonding Process)

Figure 7A:
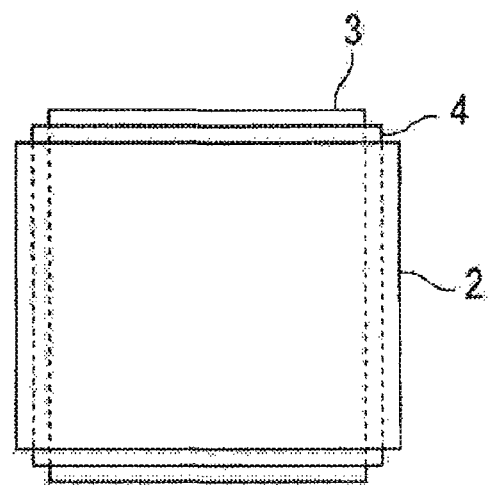
FIGS. 7A, 7B and 7C are diagrams showing a second bonding process according to the embodiment.
Figure 7B:
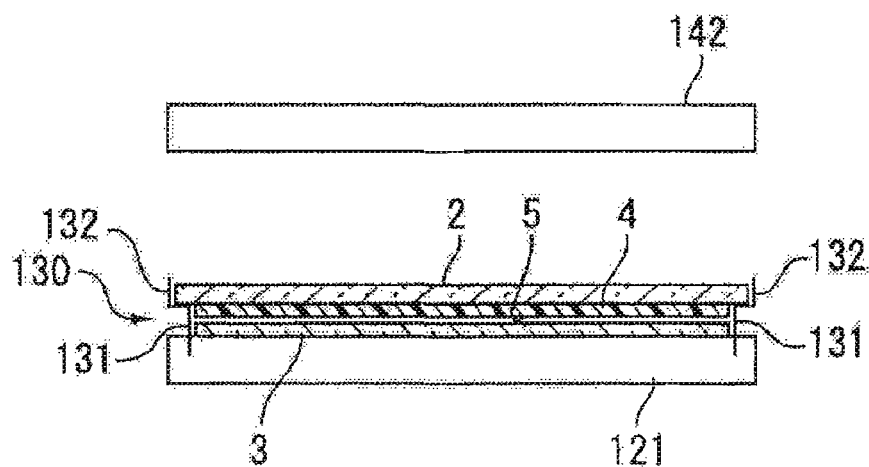
Figure 7C:
Figure 7C:
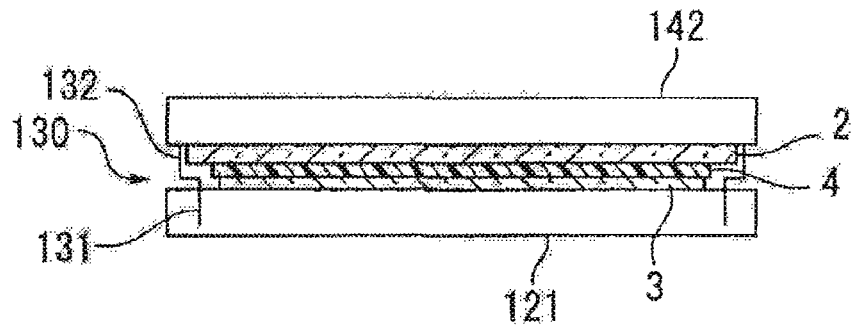

Next, in referencing FIGS. 7A, 7B and 7C, the method of performing the second bonding process will be described using the vacuum bonding apparatus 100. FIG. 7A is a plan view explaining the overlap of the first quartz crystal plate 2, the retardation film 4 and the second quartz crystal plate 3. FIG. 7B is a sectional view showing their state when set in the vacuum bonding apparatus 100 (FIG. 6A). FIG. 7C is a sectional view showing their state of being pressure bonded.

First, the door, not illustrated, of the vacuum chamber 110 (FIG. 6A) is opened to take out the first quartz crystal plate 2 bonded together with the retardation film 4 and, as shown in FIG. 7B, mount the second quartz crystal plate 3 onto a predetermined position of the lower pressure bonding plate 121. The protection film is peeled off from the other adhesion layer 5 on the retardation film 4 to expose its adhesive surface. With the exposed adhesive surface facing downwards, the first quartz crystal plate 2 is placed again to be held by the guide holders 132 of the guide apparatus 130. The vertical overlap here between the first quartz crystal plate 2, the retardation film 4 and the second quartz crystal plate 3 is as shown in FIG. 7A. The first quartz crystal plate 2 and the second quartz crystal plate 3, both having the same rectangular shape, are placed so as to be orthogonal to each other, and the lateral width, with respect to the page, of the second quartz crystal plate 3 is narrower than the lateral width of the retardation film 4. The second quartz crystal plate 3 that is mounted on the lower pressure bonding plate 121 and the retardation film that is bonded together with the first quartz crystal plate 2 held by the guide holders 132 are spaced in facing each other.

Under the state of arrangement shown in FIG. 7B, the interior of the vacuum chamber 110 is vacuumed via the vacuum pipe 111 until a predetermined degree of vacuum is attained. The liftable shaft 141 is then lowered, driven by the drive unit, not illustrated, rendering the upper pressure bonding plate 142 to move down to touch the upper end of the guide holders 132. The upper pressure bonding plate 142 is further lowered, pressing the guide holders 132 down against the urge of the elastic members 133 urging the liftable pins 131 upwards. After the retardation film 4, being bonded together with the first quartz crystal plate 2 held by the guide holders 132, has come into contact with the second quartz crystal plate 3 mounted on the lower pressure bonding plate 121, the first quartz crystal plate 2 is pressed by the upper pressure bonding plate 142 at a predetermined pressure.

Thus, as shown in FIG. 7C, the first quartz crystal plate 2, the retardation film 4 and the second quartz crystal plate 3, being sandwiched between the upper pressure bonding plate 142 and the lower pressure bonding plate 121, are pressed at a predetermined pressure via the liftable shaft 141 that transmits the driving force of the drive unit, not illustrated.

After a pressure bonding for a predetermined amount of time, the liftable shaft 141 is lifted, driven by the drive unit, not illustrated, in lifting the upper pressure bonding plate 142. As the upper pressure bonding plate 142 is lifted, the guide holders 132 are lifted by the urge of the elastic members 133, in holding the first quartz crystal plate 2 on which the retardation film 4 has been bonded together with the second quartz crystal plate 3, and returns to the original position. Then, the vacuum pipe 111 of the vacuum chamber 110 is closed, thereby introducing air into the vacuum chamber 110 and recovering the atmospheric pressure, and the door, not illustrated, of the vacuum chamber 110 is opened to take out the laminate (primitive plate for the optical low pass filter 1), the laminate having been formed by bonding the first and the second quartz crystal plates 2, 3 respectively on both sides of the retardation film 4.

The above-mentioned embodiment has the following effects.

(1) The use of a pressure sensitive adhesive, different from use of a curable bond, for bonding together the quartz crystal plates 2, 3 and the retardation film 4, makes it difficult for bubbles to be generated in the bond layers. It also prevents the optical elements from being in misalignment with each other and allows them to have a consistent adhesiveness with respect to the bonded surfaces, so that the bond strength is consistent after they have been bonded together. Furthermore, because the adhesive is applied to the retardation film 4 in advance, it is prevented from being squeezed out of the optical low pass filter 1.

(2) The transmitted wave aberration of the optical low pass filter 1 is ±1.5λ or less, which is low. Therefore, when the filter is used in an optical apparatus such as a digital still camera, the apparatus greatly excels in its optical characteristic.

(3) In the optical low pass filter 1, the adhesion layers provided at the bonded interfaces between the quartz crystal plates and the retardation film each has an average thickness of 5 to 15 μm and a difference between the thickest and the thinnest portions of 4 μm or less, within each individual layer. Therefore, the adhesion layers can keep a sufficient adhesion strength (bond strength) while giving less stress to the quartz crystal plates, thus stably maintaining a transmitted wave aberration of ±1.5λ or less. In addition, such thin adhesion layers facilitate smooth finishing of their surfaces, thereby contributing to stably keeping the transmitted wave aberration of ±1.5λ or less for the optical low pass filter 1 when it is formed.

(4) Bows of the quartz crystal plates 2, 3 are not absorbed by the adhesion layers 5, so that the bows can be mitigated. As a result, the transmitted wave aberration can be lowered to ±1.5λ or less and stabilized.

(5) The retardation film is made of plastic. Therefore, it allows the optical low pass filter 1 to have less weight.

(6) The first quartz crystal plate 2 and the second quartz crystal plate 3 are bonded together with respective faces of the retardation film 4 in a vacuum atmosphere. Therefore, bubbles can be more surely avoided between the retardation film 4 and the quartz crystal plates 2, 3.

(7) A silane coupling agent contained in the adhesive makes the adhesion between the quartz crystal plates 2, 3 and the retardation film 4 more excellent and realizes an excellent resistance to moisture and solvents.

(8) Since the retardation film 4 is applied with a pressure sensitive adhesive in advance and covered with a protection film, a cleaning process is not required at the time when it is bonded together with the quartz crystal plates 2, 3. Mixture of dust and extraneous matters is also made little.

(9) The difference of thermal expansion coefficient between the retardation film 4 and the quartz crystal plates (birefringent plates) 2, 3 can be absorbed by the viscoelasticity of the adhesion layers 5. Therefore, the bond strength can be maintained against so-called thermal shocks.

The invention has been disclosed above in its most preferred structure, method, and the like however, the invention is not limited to the above-described embodiment. Namely, although the invention has been specifically illustrated and described mainly concerning a particular example, those skilled in the art may further make various modifications to the embodiment described above, in its shape, materials, quantity or any other detailed structure, without departing from the technical and intentional scope of the invention.

Thus, the above-disclosed statements limiting the shape, materials, and so on, of the invention are not intended to limit the scope of the invention, but to explain it with an example in order to facilitate understanding. Accordingly, any statement on any of its members using a name that excludes part or all of the limitations on its shape, materials, and so on, will be included in the invention.

For example, in the embodiment, the optical low pass filter 1 is comprised of the quartz crystal plates 2, 3 and the retardation film 4, but, instead, three quartz crystal plates may be used to form an optical low pass filter.

Furthermore, it is described above that the first bonding process and the second bonding process are both performed using the vacuum bonding apparatus 100. However, it is preferable in terms of the manufacturing efficiency that only the second bonding process is performed in a vacuum atmosphere, for the invention does not require the first bonding process to be performed in a vacuum atmosphere.

Moreover, the upper pressure bonding plate 142 and the lower pressure bonding plate 121 may be each designed to have a built-in electric heater (not illustrated) or other heating means. Heating of the adhesive using a heating means in pressure bonding softens the adhesive and makes its surface smooth, thereby reducing the transmitted wave aberration of the optical low pass filter 1 attained.

In addition to its use in video cameras and digital still cameras, the invention can be used in miniature cameras including mobile-phone cameras and monitoring cameras.

The entire disclosure of Japanese Patent Application Nos: 2005-260496, filed Sep. 8, 2005 and 2006-194787, filed Jul. 14, 2006 are expressly incorporated by reference herein.

The invention claimed is:

1. An optical low pass filter comprising:
   a plurality of optical elements bonded together and defining a bonded interface between each of the plurality of optical elements, the plurality of optical elements are quartz crystal plates; and
   at least one adhesion layer including an adhesive, the at least one adhesion layer having an average thickness of 5 to 15 μm and a difference between a thickest portion and a thinnest portion of the adhesion layer being 4 μm or less, wherein
   the plurality of optical elements being provided with an adhesion layer of the at least one adhesion layer at each bonded interface between the plurality of optical elements, and
   the low pass filter having a transmitted wave aberration of ±1.5λ or less (where λ represents an incident wavelength).

2. The optical low pass filter according to claim 1, further comprising:
   at least one flexible retardation film,
   the plurality of optical elements including quartz crystal plates, and
   the quartz crystal plates being provided with the adhesion layer of the at least one adhesion layer and a flexible retardation film of the at least one flexible retardation film at each bonded interface between the quartz crystal plates, and the at least one adhesion layer has a pressure sensitive adhesive power (based on JIS Z 0237) of at least 10 N/25 mm.

3. The optical low pass filter according to claim 2, the at least one adhesion layer having a ball tack value (based on JIS Z 0237) of at least 2.

4. The optical low pass filter according to claim 2, wherein the flexible retardation film is a λ/2 plate.

5. The optical low pass filter according to claim 1, wherein: the at least one adhesion layer has a ball tack value (based on JIS Z 0237) of at least 2.

6. The optical low pass filter according to claim 1, the at least one adhesive including a silane coupling agent.

7. The optical low pass filter according to claim 1, further comprising a first antireflection film disposed on a surface of incident light of a first optical element; and
a second antireflection film disposed on a surface of outgoing light of a last optical element.

8. The optical low pass filter according to claim 7, wherein the first and second antireflection films are infrared reflective films.

9. The optical low pass filter according to claim 1, wherein the plurality of optical elements are rotated with respect to each other 90° about an axis perpendicular to their respective bonded interfaces.

* * * * *